United States Patent
Devireddy et al.

(10) Patent No.: US 9,282,033 B2
(45) Date of Patent: Mar. 8, 2016

(54) INTELLIGENT HANDLING OF VIRTUAL MACHINE MOBILITY IN LARGE DATA CENTER ENVIRONMENTS

(71) Applicant: Cisco Technology, Inc., San Jose, CA (US)

(72) Inventors: Dileep K. Devireddy, San Jose, CA (US); Shyam Kapadia, Santa Clara, CA (US); Nilesh Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 13/959,996

(22) Filed: Aug. 6, 2013

(65) Prior Publication Data

US 2015/0043581 A1   Feb. 12, 2015

(51) Int. Cl.
| | |
|---|---|
| H04L 12/713 | (2013.01) |
| H04L 12/741 | (2013.01) |
| H04L 29/12 | (2006.01) |
| H04L 12/931 | (2013.01) |
| H04L 29/08 | (2006.01) |

(52) U.S. Cl.
CPC .............. *H04L 45/586* (2013.01); *H04L 45/74* (2013.01); *H04L 49/70* (2013.01); *H04L 61/2596* (2013.01); *H04L 61/6022* (2013.01); *H04L 61/103* (2013.01); *H04L 61/6009* (2013.01); *H04L 67/10* (2013.01)

(58) Field of Classification Search
CPC ....... H04L 45/66; H04L 45/74; H04L 45/586; H04L 61/103; H04L 61/2596; H04L 61/6022; H04L 61/6013
See application file for complete search history.

(56) References Cited

U.S. PATENT DOCUMENTS

| | | | |
|---|---|---|---|
| 7,076,251 B2 | 7/2006 | Jagadeesan et al. | |
| 8,122,113 B2 | 2/2012 | Harrington et al. | |
| 8,175,009 B2 | 5/2012 | Tallet et al. | |
| 2010/0165876 A1* | 7/2010 | Shukla et al. | 370/254 |
| 2011/0299537 A1* | 12/2011 | Saraiya et al. | 370/392 |
| 2011/0320577 A1 | 12/2011 | Bhat et al. | |
| 2012/0166618 A1 | 6/2012 | Dahod et al. | |
| 2012/0275328 A1* | 11/2012 | Iwata et al. | 370/252 |
| 2012/0294309 A1 | 11/2012 | Cai et al. | |
| 2012/0311568 A1 | 12/2012 | Jansen | |
| 2013/0024553 A1 | 1/2013 | Mittal et al. | |
| 2013/0266019 A1* | 10/2013 | Qu et al. | 370/395.53 |

(Continued)

OTHER PUBLICATIONS

Dunbar, et al. "BCP for ARP-ND Scaling for Large Data Centers," Internet Engineering Task Force (IETF), Jan. 3, 2012, pp. 1-12.

(Continued)

*Primary Examiner* — Hassan Kizou
*Assistant Examiner* — Hector Reyes Ortiz
(74) *Attorney, Agent, or Firm* — Edell, Shapiro & Finnan, LLC (57) ABSTRACT

At a physical device in a network configured to host a virtual switch and one or more virtual machines, a packet is received at the virtual switch from a source virtual machine that is directly attached to that virtual switch. A destination Media Access Control (MAC) address is identified from the packet indicating a destination virtual machine for the packet. In response to determining that the destination MAC address of the packet is not present in a database of MAC addresses accessible by the virtual switch, the destination MAC address of the packet is replaced with a shared MAC address associated with a plurality of physical switches in the network.

24 Claims, 6 Drawing Sheets

(56) References Cited

U.S. PATENT DOCUMENTS

| | | | | |
|---|---|---|---|---|
| 2014/0064104 | A1* | 3/2014 | Nataraja et al. | 370/248 |
| 2014/0269709 | A1* | 9/2014 | Benny et al. | 370/392 |
| 2014/0344424 | A1* | 11/2014 | Sato | 709/221 |
| 2014/0376550 | A1* | 12/2014 | Khan et al. | 370/392 |

OTHER PUBLICATIONS

Narten, et al., "Problem Statement for ARMD," Internet Engineering Task Force (IETF), Internet-Draft, Mar. 12, 2012, pp. 1-16.

McBride, et al., "Multicast in the Data Center Overview," Internet Engineering Task Force (IETF), Mar. 10, 2012, pp. 1-11.

"Address Resolution for Massive numbers of hosts in the Data center (armd)," http://datatracker.ietf.org/wg/armd/charter/, May 23, 2012, pp. 1-2.

IEEE, "Media Access Control (MAC) Bridges and Virtual Bridged Local Area Networks—Amendment 21: Edge Virtual Bridging," IEEE Standard for Local and metropolitan area networks, IEEE Std 802.1Qbgm™—2012, Jul. 5, 2012, 191 pages.

Aggrawal et al., "Data Center Mobility based on E-VPN, BGP/MPLS IP VPN, IP Routing and NHRP: draft-raffarwa-data-center-mobility-05.txt", Network Working Group, Internet Draft, Category: Standards Track, Jun. 10, 2013, 24 pages.

Liu et al., "No Break of Virtual Network During Live Migration", 2010 Sixth International Conference on Networking and Services, IEEE, Mar. 7, 2010, pp. 175-181.

Nachum et al., "Scaling the Address Resolution Protocol for Large Data Centers (SARP): draft-nachum-sarp-05.txt", INTAREA Working Group, Internet Draft, Intended status: Proposed Standard, Jul. 11, 2013, 20 pages.

International Search Report and Written Opinion in counterpart International Application No. PCT/US2014/049670, mailed Nov. 12, 2014, 10 pages.

* cited by examiner

INTELLIGENT HANDLING OF VIRTUAL MACHINE MOBILITY IN LARGE DATA CENTER ENVIRONMENTS

TECHNICAL FIELD

The present disclosure relates to maintaining traffic flows during virtual machine migration in a large data center environment.

BACKGROUND

With the advent of highly virtualized workloads and the drive toward cloud deployments, it is necessary to have a network infrastructure that supports a highly scalable elastic model to ensure that resources (e.g., storage, network, and computing) are efficiently utilized and can be provisioned on-demand, based on tenant/client needs. Virtualization allows virtual machine mobility, enabling stateful migration of a virtual machine from one physical server to another, and is an integral paradigm of dynamic on-demand provisioning of resources.

DESCRIPTION OF EXAMPLE EMBODIMENTS

Overview

Techniques are provided for maintaining traffic flow during virtual machine migration from one physical device to another. These techniques may be embodied as a method, apparatus or instructions in a computer-readable storage media. At a physical device in a network configured to host a virtual switch and one or more virtual machines, a packet is received at the virtual switch from a source virtual machine that is in communication with the virtual switch. From the packet, a destination Media Access Control (DMAC) address is identified, which indicates a destination host (could be virtual or physical) for the packet. A determination is made as to whether the DMAC address of the packet is present in a database of Media Access Control (MAC) addresses accessible by the virtual switch. If the determination indicates that the DMAC address is not present in the database of MAC addresses, the DMAC address of the packet is replaced with a shared MAC address associated with a plurality of physical switches in the network. The packet is then forwarded, with the shared MAC address as the DMAC address, in order to reach the destination host.

Example Embodiments

The techniques presented herein involve maintaining traffic flows during virtual machine migration from one physical device to another physical device in a network. The techniques described herein are particularly useful for massive scale data center environments, including data centers with a Clos-based architecture.

Virtual machines, in addition to having equivalent functionality to physical machines, have the added advantage of being able to reside on any physical host or server. In one approach, a virtual machine is attached to a virtual switch device running on a hypervisor, which allocates resources to allow multiple virtual machines to share a single hardware host, via one or more virtual network interfaces (VNics). Virtual machines may migrate or be reassigned to different physical devices, e.g., host servers, based on the characteristics of the network.

Figure 1A:
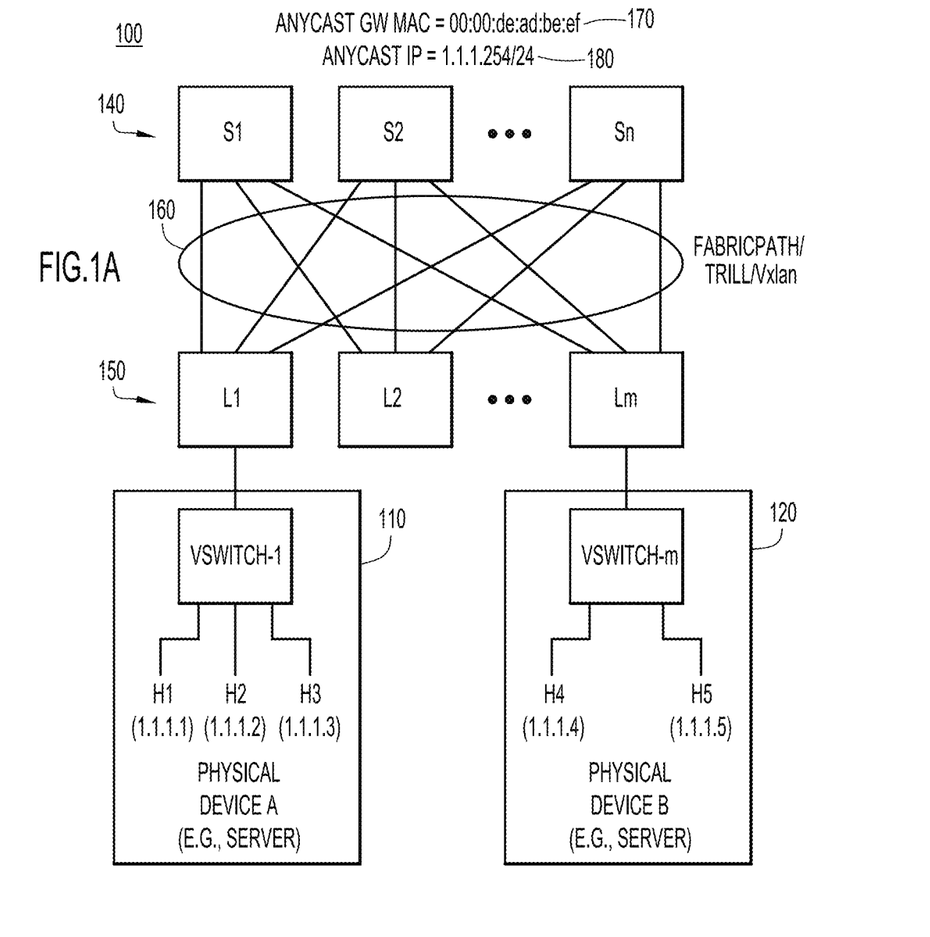
FIG. 1A is a block diagram of an example network topology showing virtual machines attached to virtual switches running in physical devices, and in which the techniques presented herein may be used for handling migration of one or more virtual machines between virtual switches running in different physical devices that are attached to different physical switches in the network topology.

Reference is first made to FIG. 1A. FIG. 1A illustrates an example spine-leaf cluster network topology 100 to which there is connected a first physical device 110 and a second physical device 120. The physical devices 110 and 120 may be server computers that can run virtual machines and virtual switches as described in more detail hereinafter. The first physical device 110 is also referred to as physical device A and the second physical device 120 is also referred to as physical device B.

The network topology 100 includes a plurality of spine switches Sl-Sn denoted collectively by reference numeral 140 and leaf switches Ll-Lm denoted collectively by reference numeral 150. The spine switches 140 connect to the leaf switches 150 by a network fabric 160, such as Cisco Systems' FabricPath technology, the IETF Transparent Interconnection of Lots of Links (TRILL) technology, or VxLAN technology. Each leaf switch is connected to a physical device, hosting one or more virtual switch devices and one or more virtual machines. Additionally, the spine and leaf switches 140 and 150 are shown to be fully meshed, with each leaf switch connected to each spine switch and each spine switch connected to each leaf switch via the network fabric 160. Together, spine and leaf switches 140 and 150 form the backbone of a scalable multipath data center fabric. For the purposes of this example, each leaf switch is also referred to as a "top-of-rack" (ToR) switch.

Each leaf switch and each spine switch may support functionality as defined by Open Systems Interconnection (OSI) model Layer 2 or Layer 3. Each leaf switch may be capable of performing address lookup operations (e.g., Internet Protocol (IP) address or MAC address lookups). Thus, it is understood that leaf switches and spine switches may have switching or routing capabilities.

In the example of FIG. 1A, physical device A 110 runs a virtual switch denoted vswitch-1 hosting virtual machines H1, H2, and H3 and is connected to leaf switch L1. Physical device B 120 runs a virtual switch denoted vswitch-m hosting virtual machines H4 and H5 and is connected to leaf switch Lm. That is, vswitch-1, which hosts virtual machines H1, H2 and H3, is connected to leaf switch L1, and vswitch-m, which hosts virtual machines H4 and H5, is connected to leaf switch Lm. For this example, all hosts are understood to be within the same subnet (e.g., 1.1.1.0/24).

Additionally, the shared Media Access Control (MAC) address 170 is the Anycast Gateway (GW) MAC address "00:00:de:ad:be:ef" and the shared Anycast Internet Protocol (IP) address 180 is "1.1.1.254/24" as shown in FIG. 1A. These will be described in more detail below.

It should also be appreciated that the topology in FIG. 1A is shown merely as an example, and any number of combinations of physical servers, leafs, spines, virtual switch devices and virtual machines may be present in network 100.

To produce a scalable network fabric, one approach is to shift Layer 3 boundaries down to the ToR access layer (e.g., at a leaf switch) and to terminate Address Resolution Protocol (ARP)/Neighbor Discovery (ND) protocols, which has the capacity to flood traffic across the network, at the ToR access layer, thereby reducing the negative effects on network performance caused by fabric-wide floods, broadcasts or multicasts. Additionally, the advantage of subnets being able to span across multiple ToRs should be retained to inherit the flexibility offered by traditional Layer 2 access architectures.

The architecture shown in FIG. 1A, provides all of these benefits by moving Layer 3 access boundaries to the ToR (e.g. at a leaf switch) and performing IP-based forwarding (routing) for traffic whether within or across subnets that may be distributed across multiple ToRs. These benefits are achieved by having a shared MAC address for the cluster as well as a shared IP address per subnet.

For communication across subnets, the default gateway-to-MAC binding is retained on the host virtual machines and the Address Resolution Protocol (ARP) cache does not need to be flushed, thereby avoiding traffic disruptions. However, for local subnet hosts, because the Layer 3 boundaries are moved to the ToR switches and subnets are distributed, to avoid unknown unicast floods, the ToRs will need to proxy for ARP requests for remote hosts in the same subnet. However, for local subnet hosts (i.e. hosts within the same subnet attached to the same virtual switch), the ToR switches should not proxy for ARP requests so as to avoid the hair-pinning of traffic between local virtual machines.

Each virtual switch stores a MAC address table which comprises the MAC address of each virtual machine that it is hosting and relevant interface information. Upon initially "signing on" or joining the network 100, each of the virtual machines H1-H5 s assigned context identifiers that may include, among other things, an IP address (e.g., an IP version 4 (IPv4) or IP version 6 (IPv6) address), a MAC address, and a port number associated with a VLAN of the virtual machine. The context identifiers may be assigned to the virtual machines H1-H5 using, e.g., a dynamic host configuration protocol (DHCP).

Each virtual switch can identify or recognize the MAC address of hosts (e.g., virtual machines) connected to the virtual switch device, and can store this information in a MAC address table. In traditional methods of layer 2 learning, a first device wishing to communicate with a second device would send to a switch, a frame comprising, among other things, a source MAC (SMAC) address identifying the MAC address of the first device and a DMAC address identifying the MAC address of the second device. Upon receipt of the frame, the switch would evaluate the frame to determine the SMAC address, and would store the SMAC address of the frame and the port on which the frame was received in a MAC address table. With virtual switches, such as vswitch-1, traditional methods of layer 2 learning are not needed for directly attached hosts. With virtual switches, the VNic of virtual machine H1 connects to vswitch-1. Therefore, as soon as virtual machine H1 is powered up, the MAC address associated with the VNic of virtual machine H1 is statically installed into the MAC address table of vswitch-1. In other words, for directly attached hosts, the virtual machine does not need to send out traffic via a VNic in order for the SMAC address of a virtual machine to be stored in the MAC address table of a virtual switch. Additionally, a physical port associated with physical device A 110, which hosts virtual machine H1, may be mapped to a plurality of virtual ports associated with the virtual machines hosted by physical device A.

Vswitch-1 also evaluates the frame to determine the DMAC address. If the DMAC address is not stored in the MAC address table of vswitch-1, vswitch-1 will flood that packet across each of its ports in the same broadcast-domain, except the port on which the frame was received. As stated previously, traditional layer 2 learning methods do not apply for directly attached VNics. However, for remote hosts or virtual machines that are not directly attached to a vswitch, regular layer 2 semantics still apply. In other words, if a layer 2 lookup miss occurs at a virtual switch (e.g., the DMAC address is not found in the MAC address table of the virtual switch), the vswitch will flood the packet within the broadcast domain or segment, so that the desired destination receives the packet. Upon receipt of the response from the destination, the virtual switch will learn the SMAC address (of the destination) so that subsequent communication may be unicasted.

If the DMAC address is found in the MAC address table of vswitch-1, the frame is forwarded to the DMAC address via the port associated with the DMAC address. Upon receipt of a communication from virtual machine H1 with a DMAC address corresponding to virtual machine H2, vswitch-1 uses the stored MAC address of virtual machine H2 to forward the packet. In this example, a virtual switch supports Layer 2 switching by allowing a virtual machine to directly communicate with other virtual machines attached to the same virtual switch and residing within the same subnet, virtual location area network (vlan), segment, or bridge-domain.

To communicate with a virtual machine in a different subnet or a remote virtual machine in the same or different subnet located on a different physical server, the packets of the communication are forwarded to ToR switch (e.g., in FIG. 1A, a leaf switch) to undergo Layer 3 forwarding to reach the destination virtual machine. For a given virtual switch connected to a leaf/ToR switch, where the virtual switch hosts one or more virtual machines, communication between virtual machines in the same subnet attached to the same virtual switch device should leverage the default Layer 2 forwarding behavior of the virtual switch to communicate via an optimal path. For remote virtual machines in the same or different subnets located on a different physical server, the leaf/ToR switch uplink should be utilized. Each leaf/ToR switch is configured to manage communications with virtual switch devices on different physical servers.

To facilitate communication to remote virtual machines, virtual machines connected to a different ToR switch, or machines on different subnets, a shared MAC address may be used. A shared MAC address is set to be a MAC address that is non-naturally occurring in a network environment. Thus, each virtual switch will contain in its MAC address table, in addition to MAC addresses for virtual machines connected to the virtual switch, a shared MAC address. In another approach, physical devices or servers may be divided into multiple groups, with each group assigned a shared MAC address.

Anycast (shared MAC address) is a communication paradigm directing the flow of packets between a single client and the "nearest" destination server through use of an Anycast address. To accomplish this, a single Anycast address is assigned to one or more servers contained within an Anycast group. Selection of a destination server that will receive an Anycast addressed packet is based on a variety of criteria, and may include factors such as network topology (e.g., the fewest number of router hops or lowest cost associated with one or more routing paths) or application metrics (e.g. available capacity, measured response times, number of active connections, etc.). Anycasting provides a means to balance and distribute connection loads, by allowing connection requests to be distributed among many different server hosts, and thus, contributing to better network performance and improved scalability.

A virtual machine may send a packet to an Anycast server by placing the Anycast address in the packet header. The network will then attempt to deliver the packet to a server having a matching Anycast address. The Anycast gateway MAC address can be configured on the virtual switch device or communicated to the virtual switch device via Representational State Transfer (REST) (Application Programming Interfaces) APIs or potentially down from the ToR using an extension in a First-Hop protocol like the IEEE 802.1Qbg Virtual Station Interface Discovery Protocol (VDP). A Forwarding Information Base (FIB) on the ToR maintains next-hop address information based on the information in IP routing tables, and is designed to optimize destination address lookups. Additionally, the same methodology may be applied for both IPv4 and IPv6 traffic.

An ARP cache provides a mapping of IP addresses to MAC addresses, essentially linking Layer 3 (Network/IP Addressing) to Layer 2 (Data-Link/Ethernet Addressing). ARP can be used to send and receive a series of messages between networking devices to establish a mapping of IP to MAC addresses. For example, if virtual machine H1, connected to vswitch-1, wishes to communicate with virtual machine H2 in the same subnet, and virtual machine H1 does not have the MAC address of virtual machine H2 previously stored in its ARP table, virtual machine H1 can send out an ARP request, which is broadcast to the network, containing the destination IP address (i.e., in this case, the IP address of virtual machine H2) of the destination virtual machine that it wishes to communicate with. The virtual machine with a matching IP address (i.e., in this case virtual machine H2) will respond with an ARP reply message. Upon receipt of the ARP reply message, virtual machine H1 will identify the MAC address corresponding to the machine that sent a reply to the broadcast IP address, and will store this relationship (MAC address to IP address) in an ARP table, such as the ARP cache. Additionally, a physical device configured as an Anycast server, would respond to an ARP request with an Anycast MAC address. In some embodiments, an ARP cache is refreshed or updated about every four hours.

Thus, referring back to FIG. 1A, for communication from virtual machine H1 to virtual machine H4, wherein virtual machine H4 is attached to a different leaf switch than virtual machine H1, the header of the packet sent from virtual machine H1 includes a shared MAC address as the DMAC address. Upon receipt, vswitch-1 identifies the shared MAC address of the incoming packet and forwards the communication to the leaf/ToR switch L1. The ToR switch then forwards (aka routes) the communication until reaching its desired destination. In this scenario, the header of the packet from virtual machine H1 would also contain the IP address of virtual machine H4 in order to reach its desired destination.

Figure 1B:
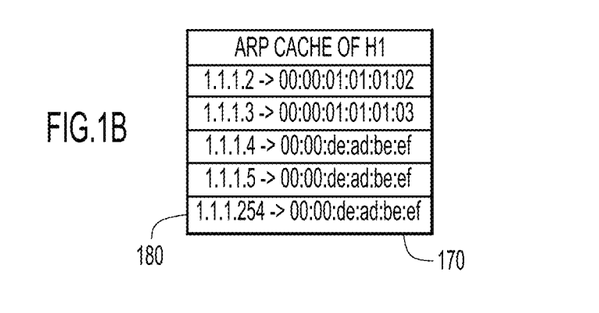
FIG. 1B illustrates an example of the content of an Address Resolution Protocol (ARP) cache associated with a virtual machine prior to migration from one physical device to another physical device.

Reference is now made to FIG. 1B. Virtual machine H1, being in active communication with all of the hosts (e.g., H1-H5), contains an ARP cache as shown in FIG. 1B. The ARP cache is a table that lists a correspondence between MAC addresses and IP addresses of other virtual machines that virtual machine H1 has been in communication with. Notably, ARP entries for virtual machines that are not hosted by the same server/physical device as virtual machine H1 (e.g., H4 and H5), are assigned a shared MAC address/Anycast GW MAC Address. ARP entries for virtual machines that are hosted by the same server/physical device as virtual machine H1 (e.g., H2 and H3) are assigned the actual physical MAC address of the destination virtual machine. The ARP cache also contains the Anycast IP address 180, mapping the shared MAC address (Anycast GW MAC address) 170 to the Anycast IP address 180.

In summary, communication for FIG. 1A proceeds as follows. For communication between virtual machines located within the same segment/subnet (attached to the same virtual switch), traffic between virtual machines can be forwarded directly via physical MAC addresses. For communication between virtual machines attached to different virtual switches (i.e., remote hosts within same or different segments/subnets), traffic is forwarded by the virtual switch to the ToR, which performs IP-based forwarding (routing), via a DMAC address set as a shared MAC address (e.g., an Anycast GW MAC address).

Figure 2A:
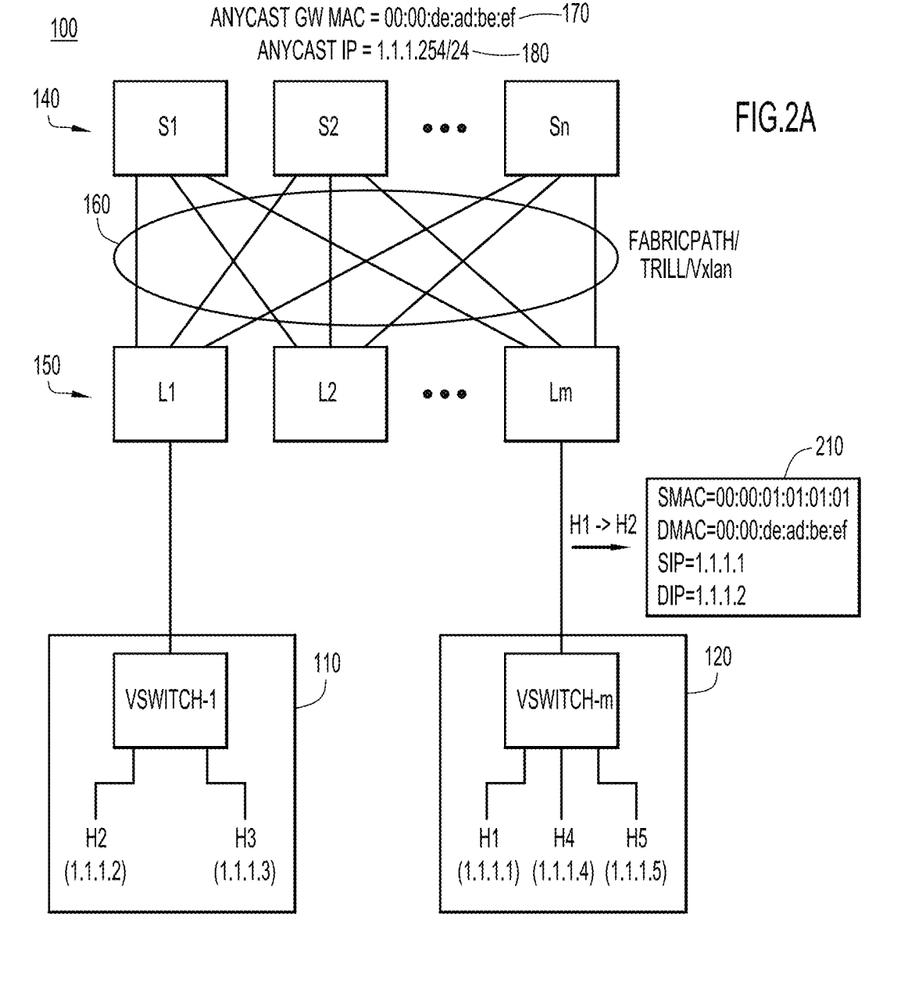
FIG. 2A is a diagram similar to FIG. 1A but after migration of a virtual machine originally connected to a first virtual switch running in a first physical device to a second virtual switch running in a second physical device that is attached to a different physical switch than the first physical device, and header information associated with a traffic flow between two virtual machines on different physical devices.
Figure 2B:
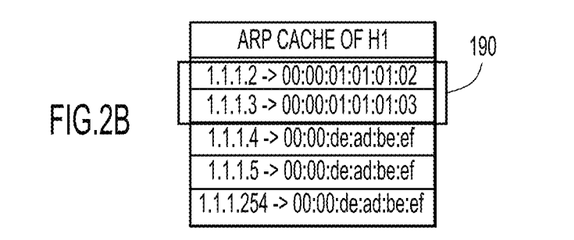
FIG. 2B is a diagram similar to FIG. 1B, but illustrating the contents of the ARP cache for the virtual machine, post migration for the scenario depicted in FIG. 2A.

Reference is now made to FIGS. 2A and 2B for a description of a scenario in which virtual machine H1 has migrated from physical device A 110 to physical device B 120, for example, based on the processing capabilities of physical device A 110 and/or physical device B 120 or for any of a variety of other reasons for migrating virtual machine H1. For example, even though virtual machine H1 is initially assigned to physical device A 110 (as in FIG. 1A), physical device A 110 may later have reduced processing bandwidth and/or physical device B 120 may have increased processing bandwidth. As a result, it may be more operationally efficient for physical device B 120 to host virtual machine H1 instead of physical device A 110. It should be appreciated that any of the virtual machines H1-H5 may be reassigned to any other physical device in a network.

When a virtual machine migrates to a new physical device, the underlying protocol/network stack as well as applications residing in the migrated virtual machine are not aware that the virtual machine has moved, and therefore, continue sending/receiving traffic without disruption or resets. However, because the physical addressing associated with the migrated virtual machine has not yet been updated to reflect the new environment, traffic from the migrated virtual machine will suffer a Layer 2 lookup miss at the new virtual switch device, as explained in additional detail below.

In FIG. 2A, when virtual machine H1 migrates from physical device A 110 to physical device B 120, and thus, from vswitch-1 to vswitch-m, virtual machine H1 retains context identifier information (e.g., the IP address and MAC address) from its previous location.

FIG. 2B shows the ARP cache of virtual machine H1 post-migration to vswitch-m. The ARP cache of virtual machine H1 is not automatically updated upon migration and reflects its previous connectivity as shown at reference numeral 190. The ARP cache of the migrated virtual machine, now on physical server B 120, is populated with the MAC addresses of the virtual machines from the physical server A 110. Thus, the ARP cache of virtual machine H1 still contains physical MAC addresses for virtual machines H2 and H3 and shared MAC addresses for virtual machines H4 and H5. As a result, if virtual machine H1 attempts to send a data packet to virtual machine H2 post-migration, a Layer 2 lookup miss will occur in vswitch-m, because vswitch-m does not contain the MAC address of virtual machine H2 in its MAC address table.

Consequently, these packets are treated as unknown unicasts by vswitch-m and sent to the leaf/ToR switch. However, a Layer 2 lookup miss will also occur at the ToR, as the leaf switch Lm will not immediately recognize the specified DMAC address, which is still the MAC address of virtual machine H2. Specifically, the ToR will not be able to route packets from vswitch-m because the DMAC address is not a Router-MAC address (e.g., a MAC address associated with a router). Thus, at the ToR, the packets will also suffer a Layer 2 lookup miss, and will be dropped, thereby affecting existing flows and adversely impacting the goal of seamless behavior for virtual machine mobility.

Although packets could, in principal, be Layer 2 switched, this would result in packet floods all across the giant fabric and toward the end-hosts which contradicts the fundamental scalability goal of large scale data center architecture.

Thus, one approach to ensure that all traffic post a virtual machine mobility event continues to flow seamlessly is to replace the DMAC address with the shared MAC address, or Anycast-gateway-MAC address (aka, router-MAC address), in the event that the DMAC address is not present in the MAC address table of the virtual switch. This replacement is only performed for unicast DMAC addresses and not for multicast (i.e., multi-destination) DMAC addresses. Consequently, the virtual switch then forwards traffic to the ToR, where the traffic would go through an IP-based FIB lookup table and be Layer 3 forwarded to reach the destination virtual machine. This approach would allow seamless handling of traffic post virtual machine migration.

Referring back to FIG. 2A, an example of this approach is shown. An example of the header information associated with a frame sent from virtual machine H1 to virtual machine H2, according to the techniques described herein, is shown at reference numeral 210, wherein the SMAC is "00:00:01:01:01:01", the DMAC address is "00:00:de:ad:be:ef", the source IP (SIP) is shown to be "1.1.1.1", and the destination IP (DIP) is shown to be "1.1.1.2". In this example, the DMAC address is shown to be the shared MAC address (i.e., Anycast GW MAC address). In particular, the DMAC address for virtual machine H2, originally set to be "00:00:01:01:01:02" was replaced with the Anycast GW MAC address "00:00:de:ad:be:ef", according to the techniques described herein.

To summarize, in the case when a virtual machine has moved to a different virtual switch, and where the ARP cache of the virtual machine remains unchanged with respect to the move, for communication between virtual machines H1 and H2 to continue, the virtual switch will determine that a Layer 2 lookup miss has occurred, and will replace the unicast DMAC address (e.g., the MAC address of virtual machine H2) with the shared MAC address and forward the traffic flow to a leaf switch. Therefore, the header of packets from the migrated virtual machine will contain the SMAC address corresponding to the physical MAC address of the source machine, a DMAC address which is the shared MAC address, a SIP which is the source IP address of the source machine, and an IP address for the destination virtual machine.

The packets are Layer 3 forwarded as usual, and there is no need for a leaf to store MAC addresses of remote hosts or forward unknown unicasts (e.g., floods) across the network fabric and toward the end-hosts. Reverse traffic from virtual machine H2 to virtual machine H1 will be handled in a similar manner by vswitch-1.

Figure 3A:
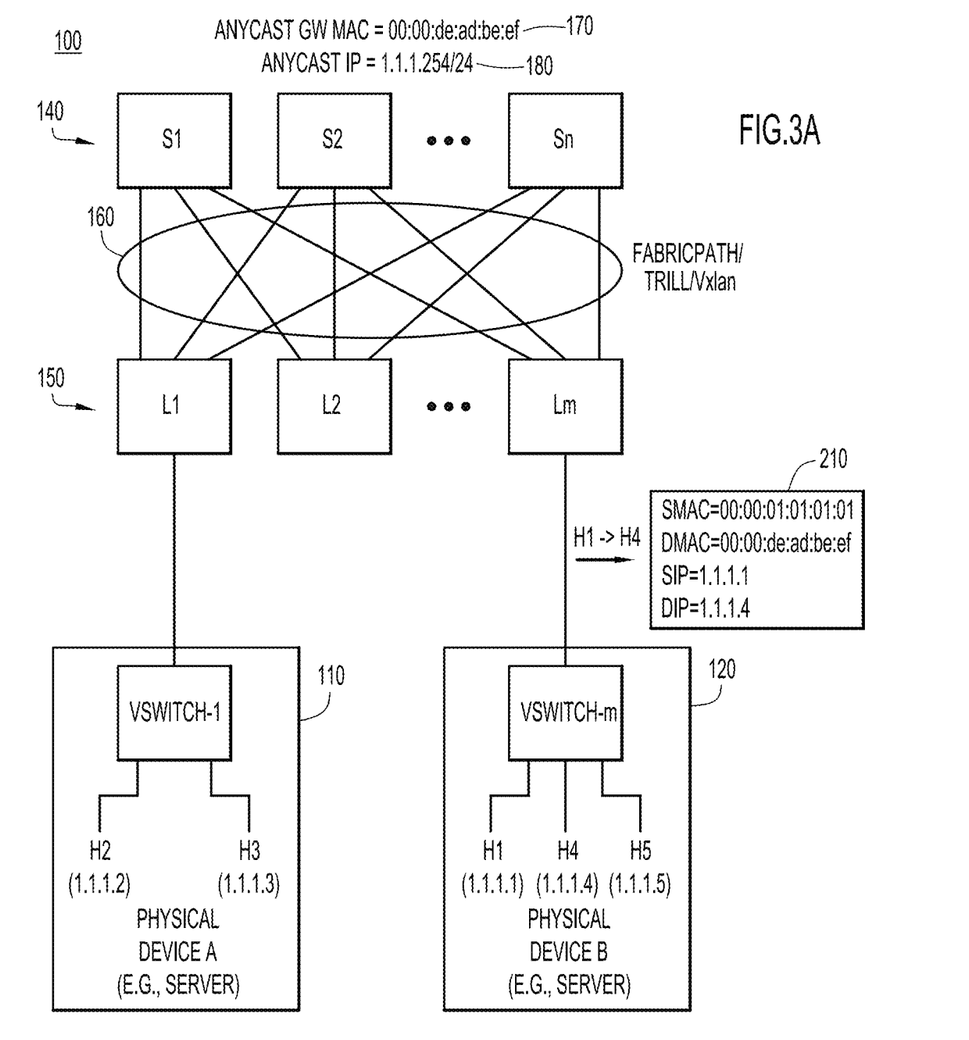
FIG. 3A is a diagram similar to FIG. 2A but after migration of the virtual machine originally connected to a first virtual switch running in the first physical device to the second virtual switch running in the second physical device that is attached to a different physical switch than the first physical device, and header information associated with traffic between the migrated virtual machine and another virtual machine on the same physical device.
Figure 3B:
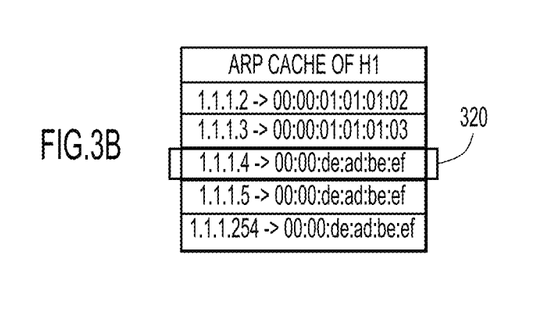
FIG. 3B is a diagram similar to FIG. 2B, but illustrating the contents of the ARP cache for the virtual machine, post migration for the scenario depicted in FIG. 3A.

Reference is now made to FIGS. 3A and 3B for a scenario where the migrated virtual machine H1 has traffic to send to a virtual machine that resides locally, e.g., between virtual machine H1 and virtual machine H4, again post-migration of virtual machine H1. In this case, even though virtual machines H1 and H4 are now local to one another (e.g., attached to the same virtual switch), communication will continue via leaf switch Lm, because the ARP cache of virtual machine H1 has not been updated to reflect the proximity of virtual machine H4. Thus, until the ARP entry for virtual machine H4 is refreshed in the ARP cache of virtual machine H1, communication will continue via leaf switch Lm.

An example of the header information associated with a frame sent from virtual machine H1 to virtual machine H4, according to the techniques described herein, is shown at reference numeral 310 in FIG. 3A, where the SMAC is "00:00:01:01:01:01", the DMAC address is "00:00:de:ad:be:ef", the SIP is shown to be "1.1.1.1", and the DIP is shown to be "1.1.1.4". In this example, the DMAC address is the Anycast GW MAC address.

Upon refreshing the ARP cache entry for virtual machine H4 in the ARP table of virtual machine H1, by replacing the shared MAC address with the MAC address of virtual machine H4 (i.e., 00:00:01:01:01:04), communication between virtual machines H1 and H4 will be directly switched by vswitch-m without forwarding the communication to leaf switch Lm. Reverse traffic for a communication scheme between virtual machines H4 and H1 will be handled in a similar manner.

FIG. 3B shows the ARP cache of virtual machine H1, post migration to a different physical server, vswitch-m. In particular, the ARP entry for a virtual machine now on the same physical device as virtual machine H1 (i.e., virtual machine H4) is shown at reference numeral 320.

Thus, the techniques described herein ensure that all traffic, post virtual machine migration, continue to flow seamlessly while avoiding the pitfalls of Layer 2 broadcasts/floods, allowing a clean, highly scalable Layer 3 ToR-based data center design to be maintained. Additionally, the techniques described herein do not rely on an "ARP entry fix up" on either the migrated virtual machine or virtual machines in communication with the migrated virtual machine. Moreover, these techniques do not require modification of the ToR, because incoming packets, packets in which a Layer 2 lookup has have occurred, are forwarded to the ToR with a DMAC address that is now a router MAC address (i.e. the shared MAC address), and the ToR will route the packets as usual. Thus, the techniques described herein are non-intrusive, in that they do not require a change in the core forwarding behavior supported by a typical virtual switch.

Figure 4:
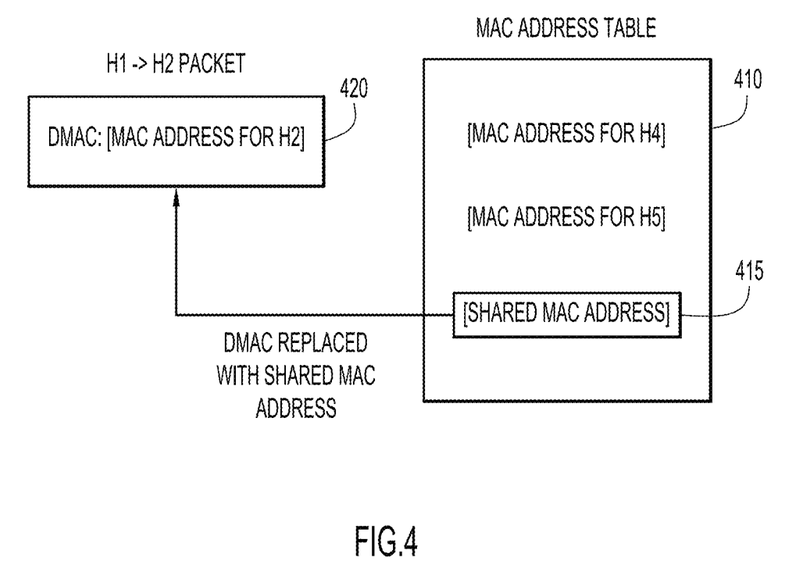
FIG. 4 depicts replacement of a destination Media Access Control (MAC) address with a shared MAC address associated with a plurality of physical switches in the network topology, according to the techniques disclosed herein.

Reference is now made to FIG. 4, which shows an example of replacement of a DMAC address with a shared MAC address. FIG. 4 shows an example MAC address table 410 of a virtual switch (e.g., vswitch-m). The MAC address table of vswitch-m has MAC addresses of virtual machines attached to the same virtual switch, e.g., virtual machines H4 and H5. Additionally, the MAC address table contains a shared MAC address 415, such as an Anycast MAC address, according to the techniques disclosed herein.

Upon migration of virtual machine H1 from physical server A 110 to physical server B 120, a packet 420 sent from virtual machine H1 to virtual machine H2 will contain the actual DMAC address for virtual machine H2, because the ARP cache of virtual machine H1 reflects the original location (pre-migration) of virtual machine H1, that is, the location when virtual machines H1 and H2 were connected to the same physical switch.

MAC address table 410 contains MAC addresses for virtual machines connected to vswitch-m, in this case, virtual machines H4 and H5 as well as the shared MAC address. (Note that MAC address table 410 will not contain an entry for virtual machine H1 until a packet is received by virtual machine H1.) Notably, the MAC address table does not contain an entry for virtual machine H2, which is located on a different virtual switch. Thus, the determination is made by the virtual switch to replace the DMAC of the packet sent from virtual machine H1 with the shared MAC address to facilitate routing of this packet to virtual machine H2.

Figure 5:
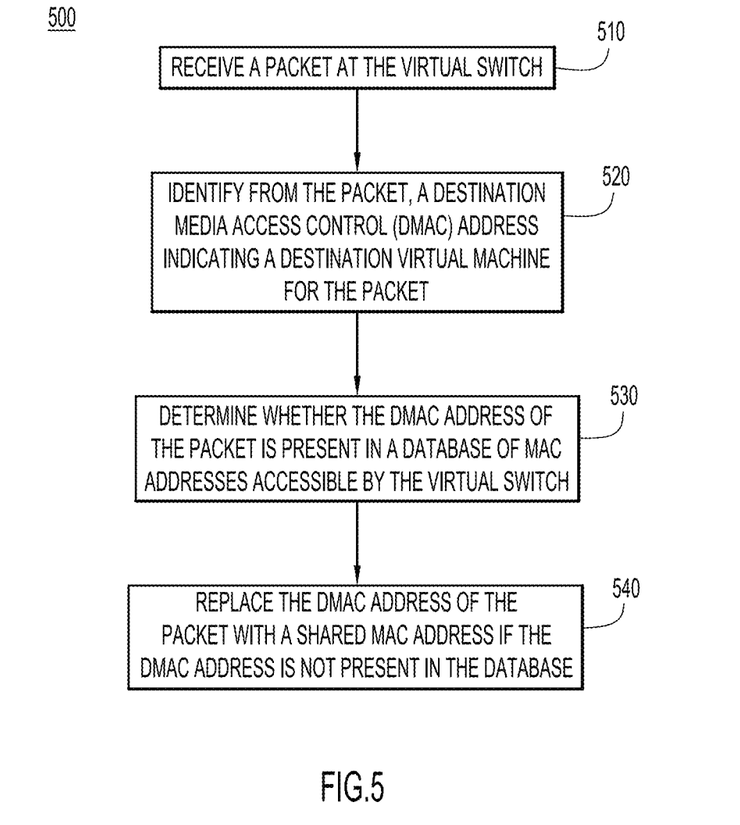
FIG. 5 is a flow chart depicting operations performed at a physical device to determine whether the DMAC address of the packet is to be replaced with the shared MAC address.

Reference is now made to FIG. 5. FIG. 5 shows an example flow chart 500 depicting operations performed by a virtual switch to ensure seamless flow of traffic. At operation 510, a packet is received at a virtual switch that is running on a physical server configured to host one or more virtual machines (e.g., virtual machines H1-H5) that is a source of the packet. At operation 520, a destination media access control (DMAC) address associated with a destination virtual machine is identified from the packet. At operation 530, a determination is made as to whether the DMAC address of the packet is present in a database of MAC addresses accessible by the virtual switch. If the DMAC address is not present in the database (i.e., if the DMAC address is not known to the virtual switch), at operation 540, the DMAC address of the packet is replaced with a shared MAC address and is subsequently forwarded upstream where it gets routed to the indicated destination.

Figure 6:
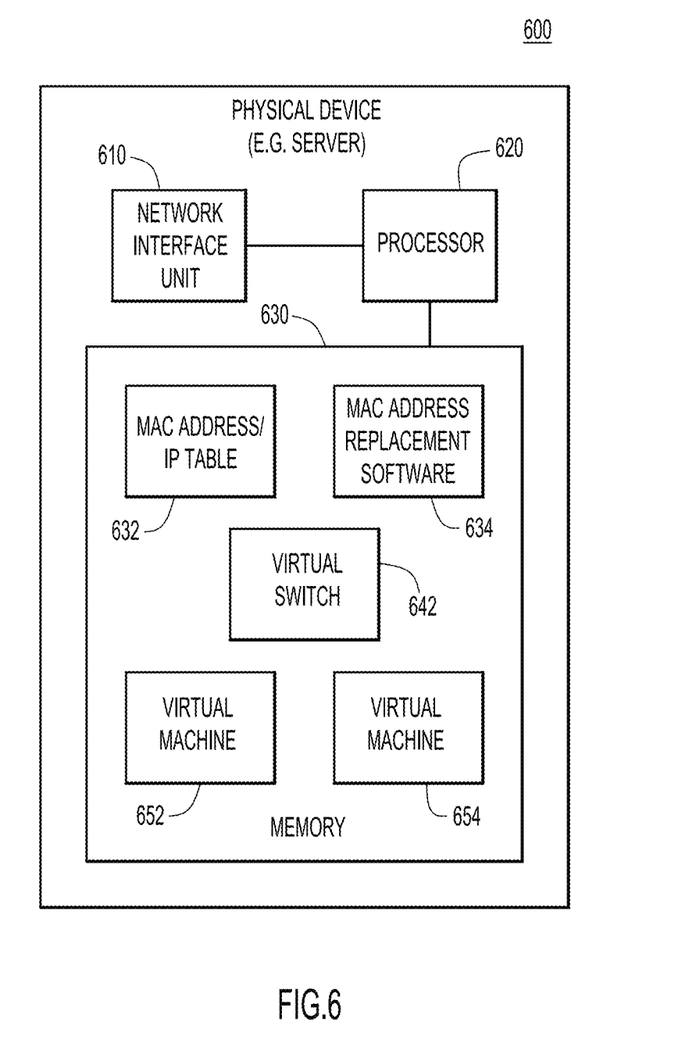
FIG. 6 is an example block diagram of a physical device configured to perform the operations depicted in FIG. 5, according to the techniques presented herein.

FIG. 6 illustrates an example block diagram of an apparatus (e.g., a physical device) configured to support a virtual switch and to perform the techniques presented herein. The physical device 600, e.g., a server computer, comprises a network interface unit 610, a processor 620 and memory 630. The network interface unit 610 is configured to enable network communications so as to interface with a network, e.g., via a leaf switch. While conceptually illustrated as a "network interface unit," it will be appreciated that a physical server may contain more than one network interface or type of interface to communicate with other devices within the network. The processor 620 is one or more microprocessors or microcontrollers and executes the identification, determination and replacement logic associated with the techniques disclosed herein. The memory 630 stores a MAC address/IP table 632 (e.g., an ARP table) and instructions for MAC address replacement software 634. Additionally, the memory 630 stores executable instructions for one or more virtual switch devices 642 and for a plurality of virtual machines (e.g., virtual machines 652 . . . 654).

Memory 630 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 630 may comprise one or more tangible (e.g., non-transitory) computer readable storage media (e.g., a memory device) encoded with software comprising computer executable instructions, and when the software is executed by the processor 620, the processor 620 is operable to perform the operations described herein in connection with the identification, determination and replacement logic. In other approaches, the MAC address/IP table 632 and MAC address replacement software 634 are stored in one or more databases accessible by processor 620.

The functions of the processor 620 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

It should be appreciated that the techniques described above in connection with all embodiments may be performed by one or more computer readable storage media that is encoded with software comprising computer executable instructions to perform the methods and steps described herein. For example, the operations performed by vswitch-1 and vswitch-m may be performed by one or more computer or machine readable storage media (e.g., non-transitory) or device executed by a processor and comprising software, hardware or a combination of software and hardware to perform the techniques described herein.

In summary, a method is provided comprising: at a physical device in a network configured to host a virtual switch and one or more virtual machines, receiving a packet at the virtual switch from a source virtual machine that is in communication with the virtual switch; identifying from the packet, a destination Media Access Control (MAC) address indicating a destination virtual machine for the packet; determining whether the destination MAC address of the packet is present in a database of MAC addresses accessible by the virtual switch; and if the determining indicates that the destination MAC address is not present in the database, replacing the destination MAC address of the packet with a shared MAC address associated with a plurality of physical switches in the network.

In addition, an apparatus is provided comprising: a network interface unit configured to receive a packet from a source virtual machine in communication with the virtual switch and a processor. The processor is coupled to the network interface unit and is configured to: host a virtual switch and one or more virtual machines; identify from the packet, a destination Media Access Control (MAC) address indicating a destination virtual machine for the packet; determine whether the DMAC address of the packet is present in a database of MAC addresses accessible by the virtual switch; and replace the DMAC address of the packet with a shared MAC address associated with a plurality of physical switches in the network, if the determining indicates that the DMAC address is not present in the database.

Furthermore, a computer readable media is provided encoded with software comprising computer executable instructions and when the software is executed operable to: at a switch device in a network configured to host a virtual switch and one or more virtual machines, receive a packet at the virtual switch from a source virtual machine that is in communication with the virtual switch; identify from the packet, a destination Media Access Control (MAC) address indicating a destination virtual machine for the packet; determine whether the DMAC address of the packet is present in a database of MAC addresses accessible by the virtual switch; and replace the DMAC address of the packet with a shared MAC address associated with a plurality of physical switches in the network, if the determining indicates that the DMAC address is not present in the database.

The above description is intended by way of example only. Various modifications and structural changes may be made therein without departing from the scope of the concepts described herein and within the scope and range of equivalents of the claims.

What is claimed is:

1. A method comprising:
   at a physical device in a network configured to host a virtual switch and one or more virtual machines, receiving a packet at the physical device hosting the virtual switch from a source virtual machine that is in communication with the virtual switch;
   identifying from the packet, a destination Media Access Control (MAC) address indicating a destination virtual machine for the packet;
   determining whether the destination MAC address of the packet is present in a database of MAC addresses accessible by the virtual switch; and
   if the determining indicates that the destination MAC address is not present in the database, replacing the destination MAC address of the packet with a shared MAC address, wherein the shared MAC address is associated with a plurality of physical switches in the network.

2. The method of claim 1, further comprising forwarding the packet using the shared MAC address as the destination MAC address to the destination virtual machine via a destination physical switch in the network.

3. The method of claim 2, wherein forwarding comprises performing a forwarding table lookup to forward the packet using the shared MAC address to the destination physical switch.

4. The method of claim 2, wherein forwarding comprises forwarding the packet using the shared MAC address to the destination physical switch based upon a first-hop protocol.

5. The method of claim 2, wherein forwarding comprises forwarding the packet to the destination physical switch as part of Internet Protocol traffic.

6. The method of claim 1, wherein identifying comprises identifying whether the destination MAC address is present in an Address Resolution Protocol cache maintained by the source virtual machine and indicates that the destination virtual machine is managed by the virtual switch.

7. The method of claim 1, further comprising updating the database of MAC addresses to include a MAC address of the source virtual machine.

8. The method of claim 1, wherein determining comprises determining that the destination MAC address of the packet is not present in the database when there is a layer 2 lookup miss at the virtual switch.

9. An apparatus comprising:
   a network interface unit configured to receive a packet from a source virtual machine in communication with a virtual switch; and
   a processor coupled to the network interface unit and a memory and configured to:
      identify from the packet, a destination Media Access Control (MAC) address indicating a destination virtual machine for the packet;
      determine whether the destination MAC address of the packet is present in a database of MAC addresses accessible by the virtual switch; and
      replace the destination MAC address of the packet with a shared MAC address, wherein the shared MAC address is associated with a plurality of physical switches in the network, if it is determined that the destination MAC address is not present in the database.

10. The apparatus of claim 9, wherein the processor is further configured to forward the packet using the shared MAC address as the destination MAC address to the destination virtual machine via a destination physical switch in the network.

11. The apparatus of claim 10, wherein the processor is further configured to perform a forwarding table lookup to forward the packet using the shared MAC address to the destination physical switch.

12. The apparatus of claim 10, wherein the processor is further configured to forward the packet using the shared MAC address to the destination physical switch based upon a first-hop protocol.

13. The apparatus of claim 10, wherein the processor is further configured to forward the packet to the destination physical switch as part of Internet Protocol traffic.

14. The apparatus of claim 9, wherein the processor is further configured to identify whether the destination MAC address is present in an Address Resolution Protocol cache maintained by the source virtual machine and indicates that the destination virtual machine is managed by the virtual switch.

15. The apparatus of claim 9, wherein the processor is further configured to update the database of MAC addresses to include a MAC address of the source virtual machine.

16. The apparatus of claim 9, wherein the processor is further configured to determine that the destination MAC address of the packet is not present in the database when there is a layer 2 lookup miss at the virtual switch.

17. One or more non-transitory computer readable storage media encoded with software comprising computer executable instructions and when the software is executed operable to:
   at a physical device in a network configured to host a virtual switch and one or more virtual machines, receive a packet at the virtual switch from a source virtual machine that is in communication with the virtual switch;
   identify from the packet, a destination Media Access Control (MAC) address indicating a destination virtual machine for the packet;
   determine whether the destination MAC address of the packet is present in a database of MAC addresses accessible by the virtual switch; and
   replace the destination MAC address of the packet with a shared MAC address, wherein the shared MAC address is associated with a plurality of physical switches in the network, if it is determined that the destination MAC address is not present in the database.

18. The non-transitory computer readable storage media of claim 17, further comprising instructions operable to forward the packet using the shared MAC address as the destination MAC address to the destination virtual machine via a destination physical switch in the network.

19. The non-transitory computer readable storage media of claim 18, wherein the instructions to forward further comprise instructions operable to perform a forwarding table lookup to forward the packet using the shared MAC address to the destination physical switch.

20. The non-transitory computer readable storage media of claim 18, wherein the instructions operable to forward further comprise instructions operable to forward the packet using the shared MAC address to the destination physical switch based upon a first-hop protocol.

21. The non-transitory computer readable storage media of claim 18, wherein the instructions to forward further comprise instructions operable to forward the packet to the destination physical switch as part of Internet Protocol traffic.

22. The non-transitory computer readable storage media of claim 17, wherein the instructions operable to identify further comprise instructions operable to identify whether the destination MAC address is present in an Address Resolution Protocol cache maintained by the source virtual machine and which indicates that the destination virtual machine is managed by the virtual switch.

23. The non-transitory computer readable storage media of claim 17, further comprising instructions operable to update the database of MAC addresses to include a MAC address of the source virtual machine.

24. The non-transitory computer readable storage media of claim 17, further comprising instructions to determine that the destination MAC address of the packet is not present in the database when there is a layer 2 lookup miss at the virtual switch.

* * * * *